United States Patent [19]

Ellis

[11] Patent Number: 5,287,512
[45] Date of Patent: Feb. 15, 1994

[54] COMPUTER MEMORY SYSTEM AND METHOD FOR CLEANING DATA ELEMENTS

[75] Inventor: Jackson L. Ellis, Fort Collins, Colo.

[73] Assignee: NCR Corporation, Dayton, Ohio

[21] Appl. No.: 563,217

[22] Filed: Aug. 6, 1990

[51] Int. Cl.⁵ .................................. G06F 12/02
[52] U.S. Cl. ....................... 395/425; 364/DIG. 1; 364/243.41
[58] Field of Search ... 364/200 MS File, 900 MS File; 395/425, 400

[56] References Cited

U.S. PATENT DOCUMENTS

| | | | |
|---|---|---|---|
| 3,781,812 | 12/1973 | Wymore et al. | 340/172.5 |
| 3,984,818 | 10/1976 | Gnadeberg et al. | 340/172.5 |
| 4,150,364 | 4/1979 | Baltzer | 340/703 |
| 4,157,586 | 6/1979 | Gannon et al. | 395/425 |
| 4,168,541 | 9/1979 | DeKarske | 365/230 |
| 4,315,312 | 2/1982 | Schmidt | 395/425 |
| 4,439,829 | 3/1984 | Tsiang | 395/425 |
| 4,445,172 | 4/1984 | Peters et al. | 395/425 |
| 4,467,443 | 8/1984 | Shima | 395/425 |
| 4,527,238 | 7/1985 | Ryan et al. | 395/425 |
| 4,577,293 | 3/1986 | Matick et al. | 365/189 |
| 4,630,195 | 12/1986 | Hester et al. | 395/375 |
| 4,631,668 | 12/1986 | Kubo et al. | 395/250 |
| 4,680,701 | 7/1987 | McCarthy | 364/405 |
| 4,797,813 | 1/1989 | Igarashi | 395/425 |
| 4,858,111 | 8/1989 | Steps | 395/425 |
| 4,926,317 | 5/1990 | Wallach et al. | 395/400 |
| 4,942,518 | 7/1990 | Weatherford et al. | 395/800 |
| 4,995,041 | 2/1991 | Hetherington et al. | 395/425 |
| 5,019,971 | 5/1991 | Lefsky et al. | 395/250 |
| 5,023,776 | 6/1991 | Gregor | 395/425 |
| 5,034,885 | 7/1991 | Matoba et al. | 395/425 |
| 5,043,886 | 8/1991 | Witek et al. | 395/425 |
| 5,058,006 | 10/1991 | Durdan et al. | 395/325 |
| 5,073,851 | 12/1991 | Masterson et al. | 395/425 |
| 5,075,846 | 12/1991 | Reininger et al. | 395/425 |
| 5,091,846 | 2/1992 | Sachs et al. | 395/250 |
| 5,119,485 | 6/1992 | Ledbetter, Jr. et al. | 395/425 |
| 5,123,099 | 6/1992 | Shibata et al. | 395/425 |
| 5,146,573 | 9/1992 | Sato et al. | 395/425 |
| 5,146,603 | 9/1992 | Frost et al. | 395/425 |
| 5,155,824 | 10/1992 | Edenfield et al. | 395/425 |

FOREIGN PATENT DOCUMENTS

| | | |
|---|---|---|
| 0379769 | 9/1988 | European Pat. Off. . |
| 310446 | 4/1989 | European Pat. Off. . |

OTHER PUBLICATIONS

"Intel Advanced Information 82385 High Performance 32-bit Cache Controller", Oct. 1987, Intel, Santa Clara, U.S., pp. 1–11.

Primary Examiner—Joseph L. Dixon
Assistant Examiner—Hiep T. Nguyen
Attorney, Agent, or Firm—Douglas S. Foote

[57] ABSTRACT

A method for cleaning data elements in a memory system accessible by a bus master. A first data element is transferred between the bus master and a fast memory while writing the first element to a dirty element register within the memory system. The first element is then cleaned by writing it from the register to a slow memory within the system without delaying memory access requests for the fast memory.

11 Claims, 4 Drawing Sheets

COMPUTER MEMORY SYSTEM AND METHOD FOR CLEANING DATA ELEMENTS

The present invention relates to computer memory systems. More particularly, it relates to a method for avoiding cache overflows in a memory system.

CROSS-REFERENCE TO RELATED APPLICATIONS

"Computer Memory System", U.S. patent application Ser. No. 563,216, filed concurrently herewith, invented by Edward C. King, Jackson L. Ellis, Robert B. Moussavi and Pirmin L. Weisser.

"Computer Memory Open Page Bias Method and System", U.S. patent application Ser. No. 563,221, filed concurrently herewith, invented by Edward C. King and F. Vincentinus Vermeer.

"Computer Memory System", U.S. patent application Ser. No. 563,214, filed concurrently herewith, invented by Edward C. King, Forrest O. Arnold, Jackson L. Ellis, Robert B. Moussavi, Pirmin L. Weisser and F. Vincentinus Vermeer.

"Data Prefetch Method and System", U.S. patent application Ser. No. 563,215, filed concurrently herewith, invented by Pirmin L. Weisser, F. Vincentinus Vermeer and Edward C. King.

"Method for Merging Data in A Computer Memory System", U.S. patent application Ser. No. 563,219, filed concurrently herewith, invented by Edward C. King, Forrest O. Arnold, Jackson L. Ellis, Robert B. Moussavi, Pirmin L. Weisser and F. Vincentinus Vermeer.

"Mapped Cache Structure and Method", U.S. patent application Ser. No. 563,218, filed concurrently herewith, invented by Robert B. Moussavi and Jackson L. Ellis.

"Computer Memory System and Method for Enhancing Performance on Cache Overflows", U.S. patent application Ser. No. 563,220, filed concurrently herewith, invented by Jackson L. Ellis, Robert B. Moussavi and Edward C. King.

REFERENCE TO A MICROFICHE APPENDIX

A microfiche appendix is provided herewith. The appendix includes three microfiche having a combined total of 263 frames.

BACKGROUND OF THE INVENTION

The performance of a computer system can be enhanced by the use of a memory hierarchy. For example, a three tiered memory can be constructed from low, medium, and fast memories. A low speed memory may be a magnetic disk for low cost, bulk storage of data. A medium speed memory may be constructed from DRAMs for use as the computer system's main memory. A fast memory may employ SRAMs for use as a processor cache memory. The theory behind memory hierarchy is to group code (instructions) and other data to be executed by the system processor in the highest speed memory. Since fast memory is typically the most expensive memory available, economics dictate that it be relatively small. Main memory consisting of DRAMs is denser and less expensive than a cache memory with SRAMs, and can therefore be significantly larger than the cache memory.

During operation, instructions and other data are transferred from system memory to the cache memory in order to have quick access to the variables of the currently executing program. As additional data, not in the cache, is required, such data is transferred from the main memory by replacing selected data in the cache. Various replacement algorithms are utilized to determine which data is replaced.

By definition, an efficiently operating cache architecture is one which exhibits a high ratio of "hits" to accesses. A "hit" occurs when data requested is in the cache. A number of factors influence the hit ratio. The dominate factor is the locality of reference of the code being executed. In other words, if the code is located in proximate physical locations in memory, the hit ratio will be higher than if the code is widely distributed throughout memory. Another factor influencing the hit ratio of a cache is the number of devices having access to the memory. If only a single bus master, such as the system processor, has access to the memory, the data stored in the cache can be controlled to achieve a reasonably high hit ratio. However, when more than a single bus master has access to the memory through the same cache, the cache can bounce back and forth between requests from the bus masters, greatly reducing the hit ratio. In other words, the cache is non-discriminatory, with the demands of the system processor and other bus masters affecting the cache equally. One operation can significantly impact the data make-up of the cache. For example, data cached in response to memory accesses from a non-host CPU bus master will overwrite data needed by the host processor.

Another factor affecting the hit ratio relates to the fact that both code and non-code data are cached. Blocks of data in the system memory are mapped into different physical locations in the cache. If each block of data in system memory may be mapped to only a single location, the cache is known as a direct mapped cache. Set associative mapping involves each block of data being mapped to more than a single location. For example, if each block of data may be mapped to either of two locations, the cache is known as two-way set associative. Irrespective of the number of locations available for a system memory block, when both code and non-code data are being cached, there will be overlap in their respective mappings. Thus, when both code and non-code data are cached, there can be significant thrashing which takes place as data is replaced in response to memory accesses.

An issue related to cache hits is whether or not a data element in a cache is valid and/or dirty. A data element is valid as long as no corresponding element in the system memory is more current. If the data element in the cache contains multiple data bytes, the concept of validity may extend down to the byte level. In other words, it is possible for certain selected bytes of a data element to be valid while other bytes in the same element are invalid. A data element may become wholly or partially invalid if all or some of its data bytes, respectively, are written to the system memory from a bus master while the data element resides in the cache. A data element in a cache is dirty if it is more current than a corresponding element in the system memory. A data element becomes dirty when a bus master writes the element to a cache and not to system memory.

A cache "overflow" is the condition created when a dirty and valid data element in a cache is overwritten by a bus master. To prevent the dirty and valid element from becoming lost when overwritten, the element must be written immediately into the system memory from the cache. (The efficient handling of a cache overflow is described in copending U.S. patent application Ser. No. 563,220 entitled "Computer Memory System and Method for Enhancing Performance on Cache Overflows".) An overflow write can force several individual writes, depending on the line size of the cache.

In prior memory systems, the act of cleaning requires accesses to the cache to retrieve valid and dirty elements. This results in a wait state in which the bus master attempting to write to the subject cache location must wait until the data element being cleaned is first retrieved and written to the system memory. Such prior systems require additional logic to prioritize and efficiently locate and retrieve all dirty and valid elements residing in the cache.

OBJECTS OF THE INVENTION

It is therefore an object of the present invention to provide a new and improved high performance computer memory system.

It is another object of the present invention to provide a new and improved method for cleaning data elements in a computer memory system.

It is a further object of the present invention to provide a method for avoiding cache overflows in a memory system.

It is yet another object of the present invention to provide a method for cleaning data elements in a cache without delaying memory access requests for the cache.

It is yet a further object of the present invention to provide a method for cleaning the most recently accessed data elements in a cache memory.

SUMMARY OF THE INVENTION

One form of the present invention is a method for cleaning data elements in a memory system accessible by a bus master. A first data element is transferred between the bus master and a fast memory while writing the first element to a dirty element register within the memory system. The first element is then written from the register to a slow memory within the system without delaying memory access requests for the fast memory.

In another form the present invention is a high performance computer memory system. The system comprises a system memory, bus, cache and register. The system memory stores data elements accessible by a bus master. The bus connects the memory with the bus master for the transfer of data elements. The cache and register are each connected to the bus, the register holding a dirty data element transferred between the cache and bus master.

DESCRIPTION OF A PREFERRED EMBODIMENT

Figure 1:
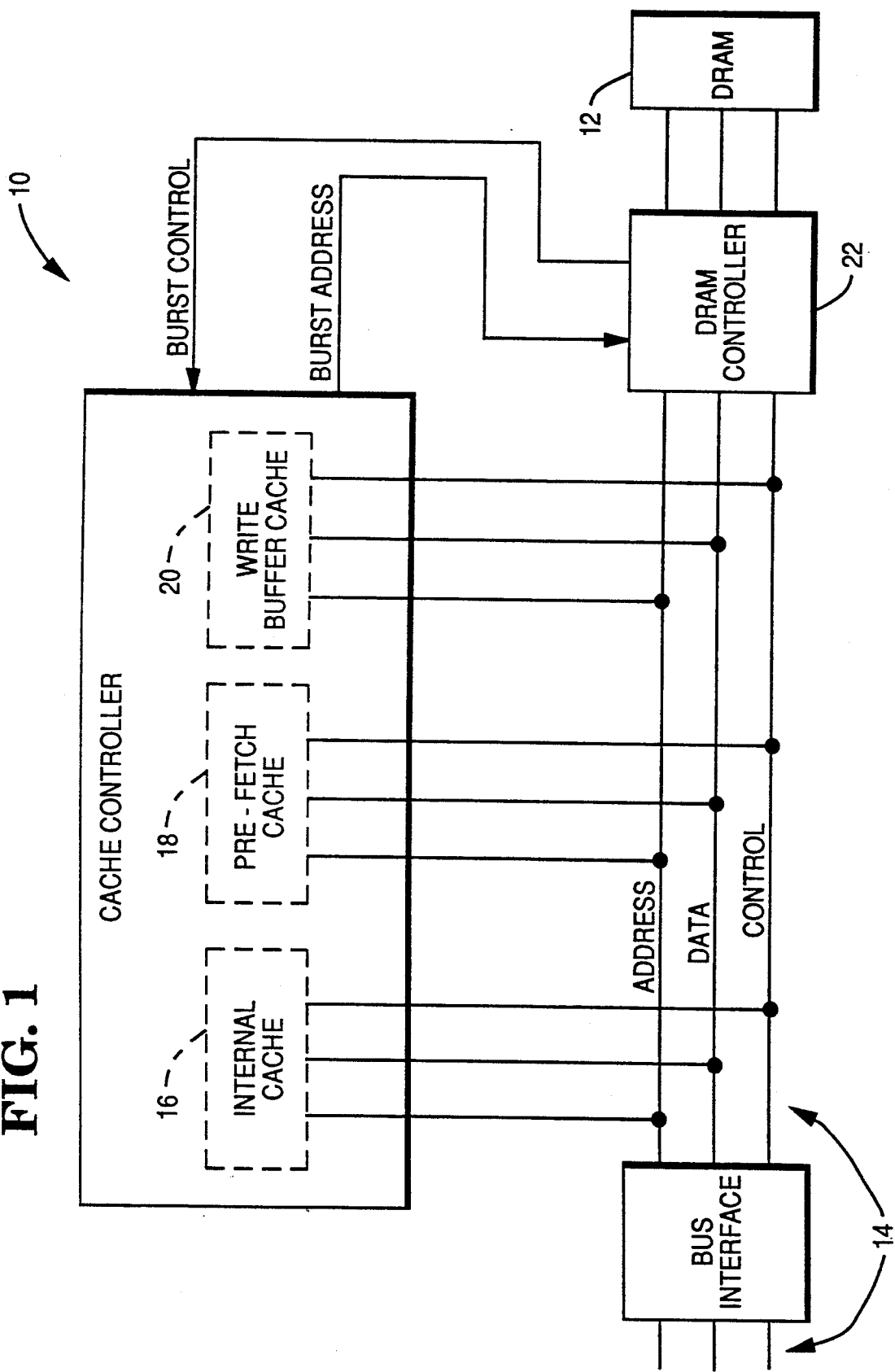
FIG. 1 is a block diagram of a high performance computer memory system according to one form of the present invention.

FIG. 1 shows a block diagram of a computer memory system 10. System 10 includes a system memory 12 which in a preferred embodiment consists of dynamic random access memory (DRAM) chips. The data stored in memory 12 can be generally divided into code data (instructions) and non-code data. As used herein, the term "data" refers to information and includes both code data (instructions) and non-code data. Memory 12 is connected to other parts of a computer system (not shown) by a bus 14. Memory system 10 is designed for use with two or more bus masters, although it is operable with a single master. More particularly, it is designed for use with a host processor such as an Intel processor 386, 386sx or 486 in combination with other bus masters or devices which will compete with the host processor for access to memory system 10. Access to DRAM 12 is controlled by DRAM controller 22 which is located within bus 14.

Memory system 10 also includes an internal cache 16, a pre-fetch cache 18 and a write buffer cache 20, each connected to bus 14. In a preferred form, internal cache 16 is a 4K byte, four-way set associative cache, pre-fetch cache 18 is a 128 byte, direct-mapped cache, and write buffer cache 20 is a 128 byte, two-way set associative cache.

A feature of the caches is that their functionality may be varied depending upon the host processor type (386, 386sx or 486) utilized. However, certain features of the caches do not vary. For example, internal cache 16 holds data which is selected solely on the basis of memory accesses by the host processor. In other words, internal cache 16 is dedicated to the host processor and will not be affected by memory accesses by other bus masters. It will be appreciated that each of the caches is readable by any of the bus masters. Thus, even though cache 16 will not allow data writes therein based on memory accesses by other than the system processor, it will be read by another bus master if requested data happens to reside therein. It will further be appreciated that each of the caches snoops (observes) any data writes not intended for it in order to invalidate its contents upon snoop hits, thereby ensuring coherency.

Another immutable feature of the caches is that pre-fetch cache 18 contains solely code data pre-fetched from DRAM 12. Furthermore, it only pre-fetches code based on a memory access by the host processor. In operation, whenever the system processor requests code data not already in the pre-fetch cache, the next sequential 128 bytes of code are pre-fetched into cache 18 as a queue in anticipation of subsequent requests for code.

Write buffer cache 20 only buffers data to be written into DRAM 12. It is not merely a write buffer, but is a cache which, as mentioned above, can be read by any bus master. However, it will not cache data from DRAM 12. The present invention, including its operation with respect to cache 20, will be discussed more fully in reference to FIG. 2 below.

An important feature of the caches is the separation of the functionality of each of the caches and the selective definition of those functions based on the processor type. By this insight, the present system is able to achieve or exceed the performance of a system utilizing a cache many times larger than the cumulative size of the subject caches. With respect to the selective definition of function based on processor type, for a system employing a 486 system processor, write buffer cache 20 buffers data writes by any bus master other than the system processor. For a system employing a 386 or 386sx system processor, internal cache 16 holds only code data and is a read only cache for the system processor, and write buffer cache 20 buffers data writes by any bus master including the system processor. The operational characteristics of the caches are defined through self configuration at power-on time based on information relating to the type of host processor present.

DRAM controller 22 supports fast page mode for accesses to DRAM 12. Fast page mode is a well known technique for speeding up accesses to DRAM by activating a row line in a memory page and then strobing sequential column lines to transfer data into or out of DRAM. DRAM 12 is divided into pages which contain either code or non-code data. A register associated with DRAM 12 is located either in DRAM 12 or DRAM controller 22 and holds the page address of a most recently accessed page. In effect, the system provides a bias towards code pages or non-code pages depending upon the type of processor connected to the system. For example, if the system processor is a 486, the address of the most recently accessed code address page is held in the register. In operation, both code and non-code data pages in DRAM 12 can be randomly accessed. If a code page is accessed on one cycle and a non-code page is accessed on the next cycle, the address of the code page is held in a register while the non-code page is accessed. Immediately after the non-code page access, the address in the register is used to reopen the code page. In contrast, if the system processor is a 386 or 386sx, the address of the most recently accessed non-code address page is held in the register. The combination of selective open page bias, fast page mode accesses and multiple caches provides increased system performance.

Write buffer cache 20 is a two-way set associative cache. The non-code data region of memory may be divided into three areas known as list, heap and stack. Data blocks in memory are reserved for the list, heap and stack, each of which has its own organization and purpose. For example, a stack is a set of data elements, only one of which can be accessed at a time. The list data is primarily read and generally not written to. In structured programs, a high percentage of writes occur to the stack with the second most data writes occurring to the heap. By proper assignment of the heap and stack data blocks in DRAM and mapping respective blocks to opposing sets in the two-way set associative cache, increased operational efficiency can be realized. Furthermore, an open page bias in the DRAM for non-code data will effectively be an open page bias for list data. In this manner, operational efficiency is further enhanced.

Figure 2A:
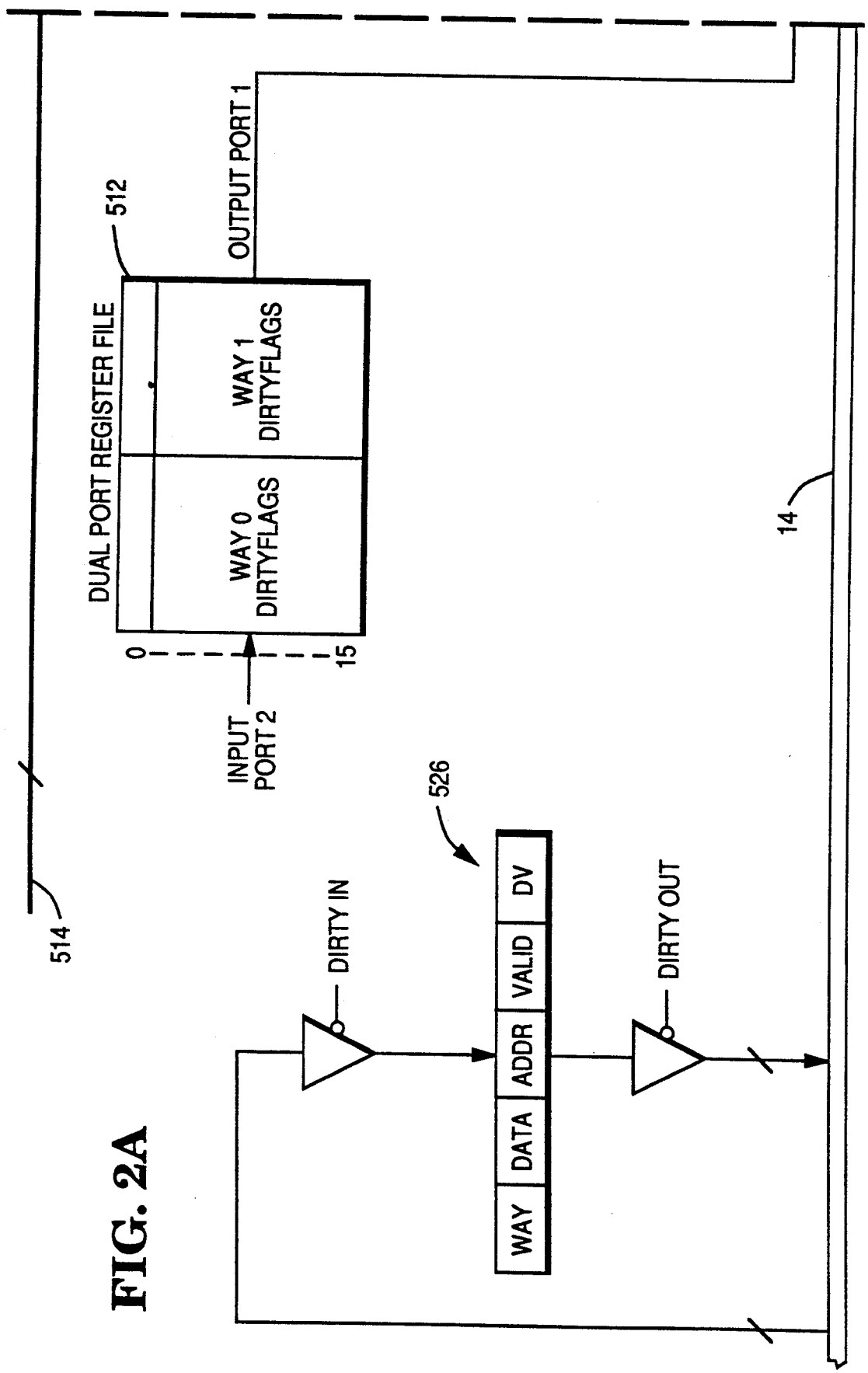
FIGS. 2A-B are a diagram of a cache and dirty element register according to one form of the present invention.
Figure 2B:
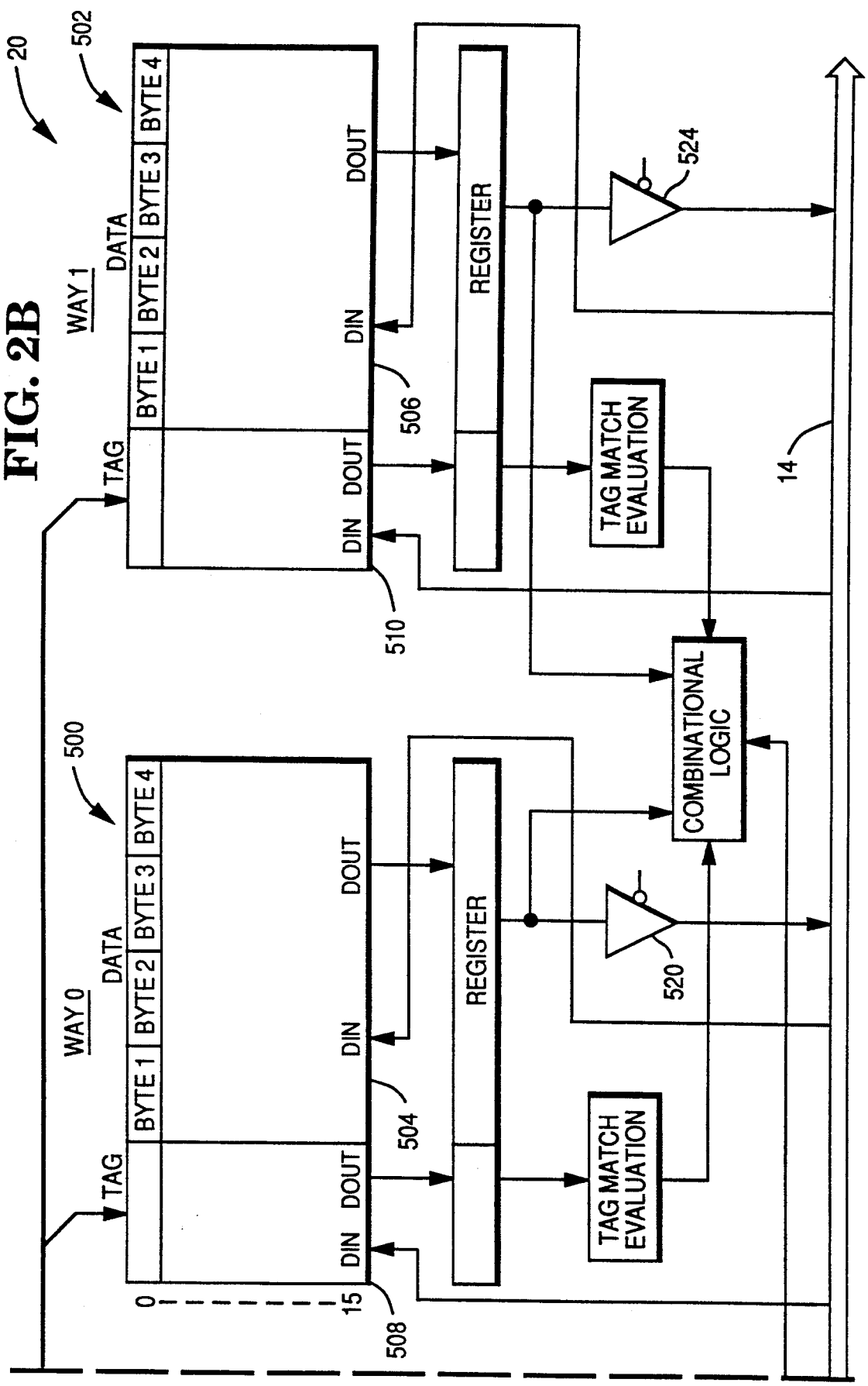

FIG. 2A-B shows more detail of write buffer cache 20 connected to bus 14. As noted previously, cache 20 is a two-way set associative cache, in a preferred embodiment. Cache 20 includes two cache ways 500 and 502. Each way has a data storage region 504 and 506, respectively, and a tag RAM 508 and 510, respectively. Data storage regions 504 and 506 store data elements and tag RAMs 508 and 510 store the tag portion of the address for the data element in corresponding locations in regions 504 and 506, respectively. A dual port register file 512 is associated with cache ways 500 and 502 and contains status information for each data element stored in cache 20. For example, it stores a dirty flag bit for each data element. A valid flag bit for each data byte is stored together with each data byte in regions 504 and 506. Cache 20 is also connected to an address/control bus 514 which receives selected address and control signals directly from accessing bus masters prior to the information being provided over bus 14. Tristate devices 520 and 524 are provided between cache 20 and bus 14 to isolate cache 20 from bus 14 and other devices connected to bus 14 at certain times, as will be discussed more fully below.

An important feature of the present invention is dirty element register 526 which is connected directly to bus 14. Register 526 holds a single data element, its address, its "way" in write buffer cache 20, valid bits for each byte of the data element, and a dirty/valid bit (DV) which indicates if a dirty and valid data element exists in register 526. The operation of register 526 will next be described with respect to cache 20. However, it will be clear to those skilled in the art that register 526 can be effectively utilized with any cache.

In operation, any dirty data element being transferred into or out of cache 20 is written to register 526. For example, any data element written to cache 20 from a bus master is by definition considered "dirty", and a dirty element flag in dual port register file 512 is set. Thus, each data element written to cache 20 from a bus master is also written to register 5.6. A data element being read from cache 20 may or may not be dirty, depending upon whether or not it was previously cleaned. If it is dirty, then the corresponding dirty flag in dual port register file 512 will be set which will signal register 526 to store the subject data element. If it is not dirty, it will not be written to register 526. The transfer of the data element from or to cache 20 occurs at the same time as the data element is written to register 526.

Once the data element is in register 526, an attempt is made to clean it by writing it to DRAM 12. The write to DRAM 12 will not delay memory access requests for cache 20 or any of the other caches or system memory. One technique that can be employed involves the monitoring of bus 14 and transmitting the data element on a free or open cycle. In a preferred embodiment, the memory system is synchronized to a clock cycle. The fastest data reads take two cycles (when there is a cache hit). When a request comes into the bus interface, predetermined address and control bits get routed directly to the cache 20 over bus 514 to start a memory access. This occurs in the first period during which period the bus 14 is idle or inactive. If there is a cache hit, the data element is placed on bus 14 during the second cycle. Since, bus 14 is open (not used) during the first period, tristate devices 520 and 524 and the bus interface (FIG. 1) isolate bus 14, register 526 and DRAM 12 from cache 20 and the bus master, and the dirty data element in register 526 is transferred to DRAM 12 during this first period. By transferring the dirty data element to DRAM 12 during open cycles, a memory access request from a bus master is not delayed. The valid bits in register 526 are used by DRAM controller 22 to transfer only valid bytes of the subject data element to DRAM 12.

If the data element is written to DRAM 12 during the open period, a signal is provided to dual port register file 512 to remove or reset the dirty flag bit. If there are no open cycles on bus 14 prior to the next access of cache 20, the next data element (if dirty) transferred to or from cache 20 overwrites the element in register 526. Thus, it is possible that a dirty data element will not be cleaned when it is transferred to register 526. However, the present invention provides the opportunity to clean the element each time it so transferred. Moreover, since the write buffer cache 20 is filled only by data writes from a bus master, the type of data tends to be accessed more than once. This provides many opportunities to clean each data element. By keeping the data elements in cache 20 generally clean, the present invention avoids significant cache overflow problems which occur when dirty data in the cache must be overwritten.

The detail design of the present invention is captured in CDL, a high level hardware description language. CDL is a software tool which unambiguously defines the hardware for a digital logic system. The CDL listing completely defines a preferred embodiment of computer memory system 10. The listing may be compiled to generate a "C" source code which may then be compiled by a C compiler to generate a standardized C Object File Format (COFF). The COFF is then input to a logic synthesis program to provide a detailed logic schematic. A logic synthesis program which may be used for this purpose is SYNOPSYS, available from Synopsys Inc., Mountain View, Calif.

Figure 3:
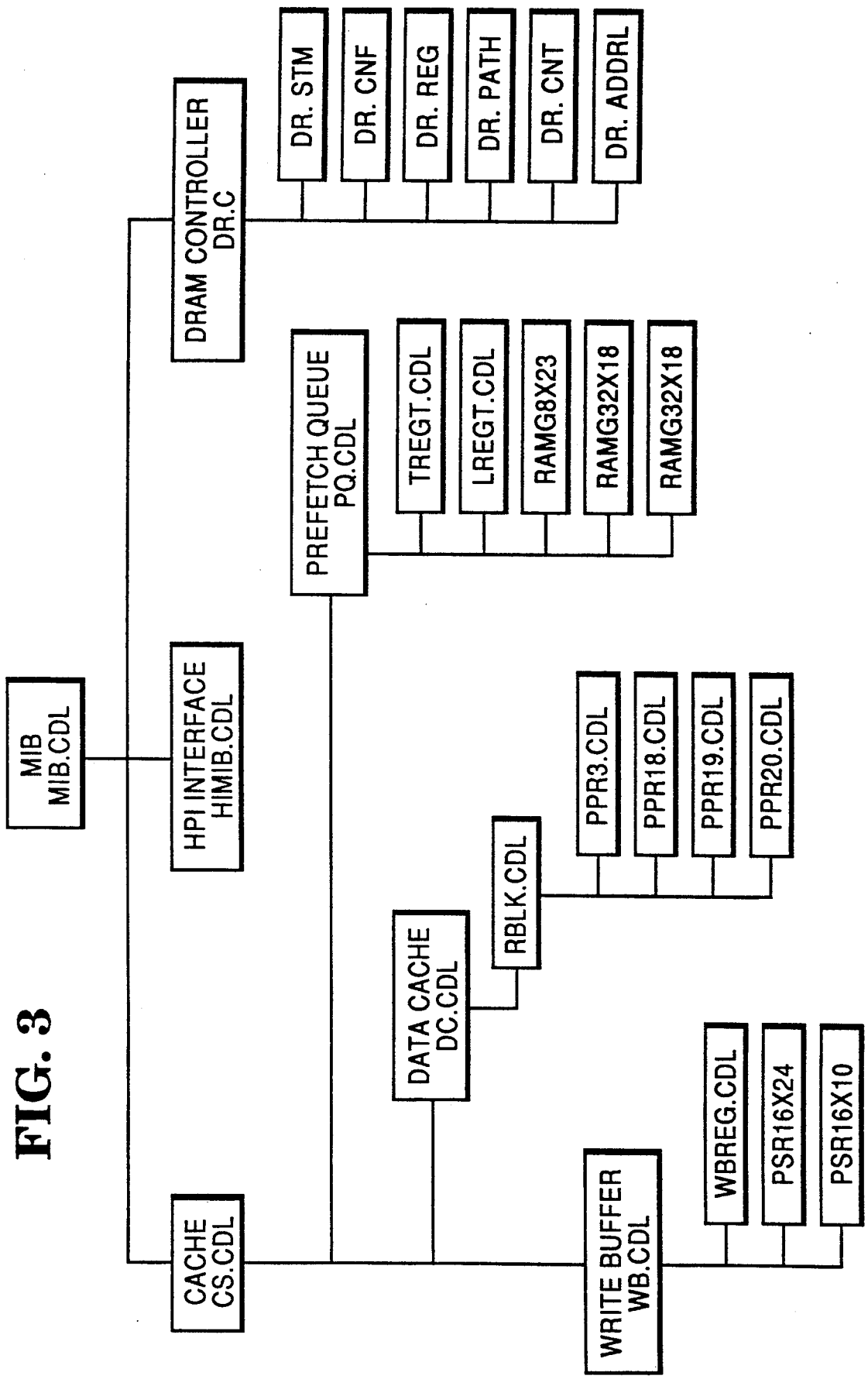
FIG. 3 is a block diagram showing the relationship between modules of the memory system.

FIG. 3 shows the relationship between the modules of the present invention. The structure and mode of operation of each of these modules is defined by the CDL listing, provided herewith as a microfiche appendix.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A method for cleaning data elements in a memory system including a bus master, a system memory accessible by the bus master through a system bus connected therebetween, and a cache and a register connected to said bus, said method comprising the steps of:
    transferring a first data element between said bus master and cache while writing said first element to said register;
    writing said first data element from said register to said system memory without delaying memory access requests for said system memory; and
    notifying said cache that said first data element has been written from said register to said system memory.

2. The method of claim 1 wherein said transferring includes writing said first element from said bus master to said cache.

3. The method of claim 2 further comprising:
    setting a dirty element flag for said element when written to said cache.

4. The method of claim 3 further comprising:
    removing said dirty element flag when said element is written from said register to said system memory.

5. A method for cleaning data elements in a memory system including a bus master, a system memory accessible by the bus master through a system bus connected therebetween, and a cache and a register connected to said bus, said method comprising the steps of:
    transferring a first data element between said bus master and cache while writing said first element to said register, wherein said transferring includes writing said first element from said bus master to said cache;
    writing a second element to said cache while overwriting said first element in said register with said second element;
    reading said first element from said cache while overwriting said second element in said register with said first element; and
    writing said first data element from said register to said system memory without delaying memory access requests for said system memory.

6. A method for cleaning data elements in a memory system including a bus master, a system memory accessible by the bus master through a system bus connected therebetween, and a cache and a register connected to said bus, said method comprising the steps of:
    transferring a first data element between said bus master and cache while writing said first element to said register, wherein said transferring includes writing said first element from said bus master to said cache; and
    monitoring said bus for an open cycle indicating said bus is inactive and writing said first data element from said register to said system memory during said open cycle and without delaying memory access requests for said system memory.

7. A method for cleaning data elements in a memory system accessible by a bus master, said memory system having a fast memory, a slow memory and dirty element register connected by a bus, comprising:
    writing a first data element from said bus master to fast memory while writing said first data element to said register;
    setting a dirty element flag for said first data element when written to said fast memory;
    monitoring said bus for an open cycle indicating said bus is inactive;
    writing said first data element from said register to said slow memory during said open cycle; and
    removing said flag when said first data element is written from said register to said slow memory.

8. A method for cleaning data elements in a memory system accessible by a bus master, said memory system having a fast memory, a slow memory and dirty element register connected by a bus, comprising:
    writing a first data element from said bus master to fast memory while writing said element to said register;
    writing a second data element from said bus master to said fast memory while overwriting said first element in said register with said second element;
    reading said first element from said fast memory while overwriting said second element in said register with said first element;
    monitoring said bus for an open cycle indicating said bus is inactive; and
    writing said first element from said register to said slow memory during said open cycle.

9. A high performance computer memory system comprising:
    a system memory for storing data elements accessible by a bus master;
    a bus connecting said memory with said bus master for transferring data elements;
    a cache connected to said bus; and
    a register connected to said bus for holding a dirty data element transferred between said cache and bus master;
    wherein said register is connected to said bus so that said dirty data element is transferred to said register from said bus.

10. The system of claim 9 further comprising:

means for isolating said bus, register and system memory from said cache and bus master so that said dirty data element may be written from said register to system memory without delaying memory access requests for said cache.

11. The system of claim 10 further comprising;

a second bus for transferring address information and selected control signals from said bus master directly to said cache without interfering with the writing of said dirty data element to said system memory.

* * * * *